United States Patent Office 3,189,147
Patented June 15, 1965

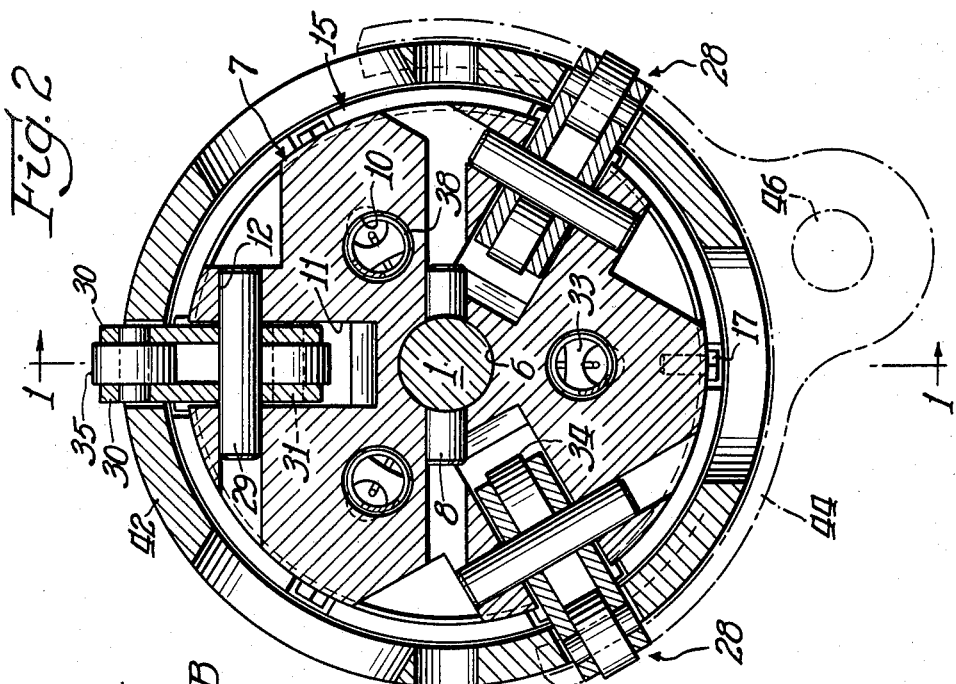
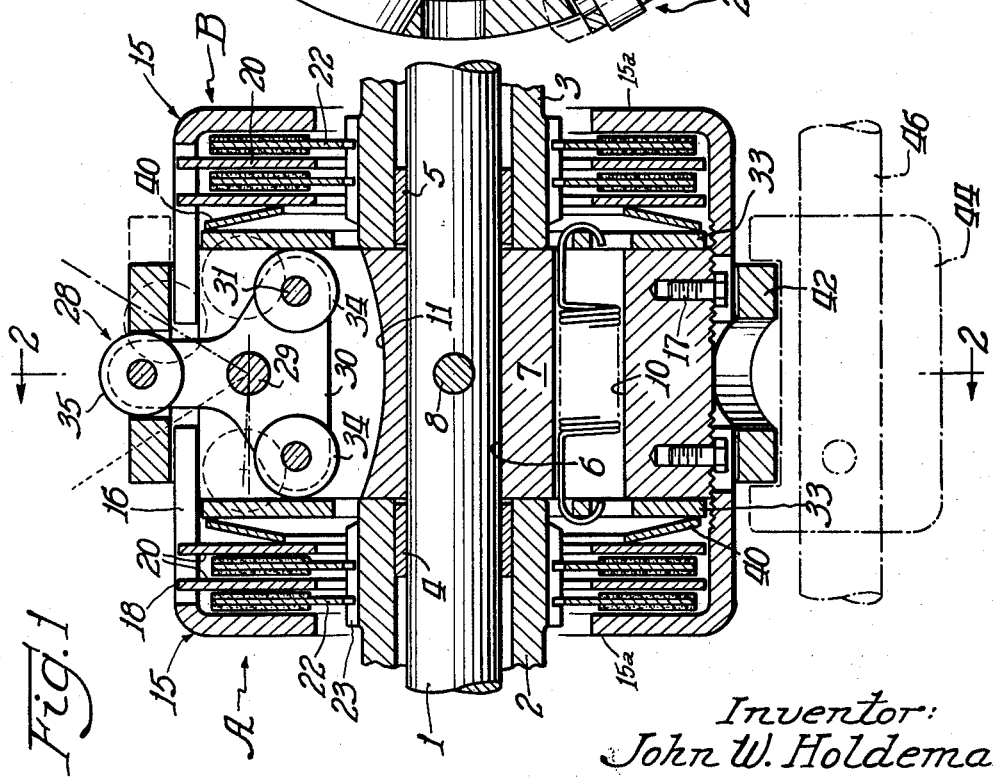

3,189,147
MULTIPLE CLUTCH WITH LEVER
John W. Holdeman, Auburn, Ind., assignor to Borg-Warner Corporation, Chicago, Ill., a corporation of Illinois
Filed May 9, 1962, Ser. No. 193,481
6 Claims. (Cl. 192—48)

This invention relates to a selective torque transmission device, more particularly to a dual or two-way multiple disc friction clutch.

Heretofore, clutch mechanisms of the general type referred to above have been relatively complex, difficult and costly to manufacture, prone to misadjustment, and troublesome to service. The present invention proposes to avoid some of these disadvantages by providing a dual multiple disc friction clutch having a simple, uncomplicated design and including a self-locking actuator and means for adjusting the compression on the disc assemblies.

It is therefore an object of the present invention to provide an improved dual multiple disc friction clutch including a pivotally mounted, over-center locking, lever-type actuator in combination with resiliently biased pressure plates to effect a self-locking system.

It is another object of the invention to provide a dual clutch mechanism wherein the friction disc receiving drums are adjustably threaded directly onto the hub member so that compression on the disc units may be varied.

It is another object of the invention to provide, in accordance with the foregoing objects, a clutch including a pair of independently actuated multiple friction disc units in combination with a pivotally mounted lever adapted to be moved into a neutral or disengaged position and first and second engaged positions wherein first and second rotary output members are respectively coupled to a rotary drive.

Other and more particular objects and advantages will be apparent from the following detailed description and drawings wherein:

FIGURE 1 is a cross-sectional view of a clutch mechanism embodying the present invention, said view being taken along the plane of line 1—1 in FIGURE 2; and FIGURE 2 is a cross-sectional view taken along the plane of line 2—2 of FIGURE 1.

In the drawings, the reference numeral 1 represents an input member comprising a rotary drive shaft adapted to be connected to any suitable rotary power source (not shown). Journalled for independent rotation on the drive shaft 1 are rotary driven output members in the form of sleeve shafts 2, 3 supported on bearings 4, 5 respectively. The input shaft extends through a bore 6 in the hub member 7 and is connected to the latter by a dowel pin 8 or other suitable means. The hub member 7, as best illustrated in FIGURE 2, is provided with a plurality of axially extending bores 10, a plurality of radially extending slots 11 and a plurality of transverse bores 12 intersecting said slots.

Threaded onto each end of hub member 7 are two identical coupling means or friction disc clutch units A and B which, as will be clear from the following description, are adapted to be selectively actuated to couple together the input member with one or the other of the output members. Each of said friction disc clutch units comprises a friction disc receiving drum 15 adjustably threaded onto the periphery of the hub 7. Locking screws 17 may be provided for maintaining the receiving drums in a specific position.

Drums 15 are further provided with a plurality of axially extending, elongated slots 16 which operatively engage complementary tabs 18 on the periphery of each of a series of driving discs 20. The driving discs 20 are thus engaged by the drums for conjoint rotation therewith, but are free to move axially.

A series of spaced driven discs 22, preferably provided with friction facings, are interposed between adjacent driving discs 20 and also between the axially outermost driving discs and the radially inwardly extending end portion 15a of said friction disc receiving drums. The driven discs 22 are splined onto the complementary splined terminal portions 23 of the driven members, so that while the discs are free to slide axially, they are fixed for conjoint rotation with said output members or shafts 2, 3.

An actuator means, which is designed to compress the driving and driven discs of each friction clutch together into a frictionally coupled relationship, comprises a plurality of lever units 28 of the toggle type disposed in the radially extending slots 11 in the hub member 7. Each of said lever units is pivotally mounted for limited rotative movement on pins 29 received in the transverse bores 12 in said hub member.

Each of said lever units comprises a pair of spaced plate members 30 having three radially extending arms or lobes. The plates are connected together by pins 31 which support a pair of pressure plate engaging rollers 34 and an actuator roller 35. It should be understood, however, that the rollers are not required since the lever units could be fabricated from a one piece blank.

The lever units 28 are adapted to assume any one of three distinct positions, including a first position where one friction clutch is engaged, a second position where the other friction clutch is engaged, and a third or neutral position where both clutches are disengaged. Moreover, the lever units are self-locking in each of the three positions for reasons which will become apparent from the following description.

Annular pressure plates 36 are positioned adjacent each end of the hub member and are supported in this position by a plurality of centering springs 38 extending through bores 10 in the hub member. The pressure plates are thus continuously biased toward the hub member and away from the disc engaging position. A Belleville type spring 40 is preferably disposed between the pressure plates and the adjacent, innermost driving discs. When the plates are shifted outwardly to one of the engaged positions, the Belleville springs resiliently urge the discs into engagement.

The stroke of the lever units is such that the rollers pass dead center and are self-locking with either of the clutch members engaged. The pressure plates 36, being spring biased in an axially inward direction, tend to oppose any shift from one position to another until the rollers reach the dead-center position against the pressure plates. Thereafter, the biasing tends to assist further movement and to maintain the lever in the position which it has assumed. For example, if the lever unit is initially in its neutral position, as shown in solid lines in FIGURE 1, and friction clutch A is to be actuated, the lever unit is pivoted in a direction to urge the pressure plate associated with clutch A axially outwardly. After the roller passes the dead-center position, the tendency of the pressure plate to return to the disengaged position holds the lever units in one of the dotted line positions with the other roller abutting the bottom of slot 11. This arrangement avoids the necessity of providing additional stop means and limits overtravel to an absolute minimum.

In order to move all of the lever units simultaneously to effect a shift from one position to another, a shifting collar 42 is provided. The shifting collar includes a plurality of circumferentially spaced openings, each receiving the third lobe of the respective lever units. A shifting yoke 44 is also provided, said yoke engaging a portion of the collar and adapted to be connected to a control rod 46.

While the invention has been described with reference to a particular embodiment, it should be understood that this is by way of example rather than limitation, and it is intended that the invention be defined by the appended claims which should be given a scope as broad as consistent with the prior art.

What is claimed is:

1. A clutch mechanism comprising: a rotary input shaft; a hub member connected to said input shaft, said hub member being provided with a radial, axially extending slot; a pair of independently journalled output shafts arranged co-axially with respect to said input shaft, each said output shaft being disposed on opposite sides of said hub member; a pair of multiple friction disc clutch units, each being disposed on opposite sides of said hub member and arranged to selectively couple said hub member with one or the other of said output shafts, each said multiple friction disc clutch unit comprising a drum member adjustably threaded onto said hub member radially outwardly from said input shaft; at least one friction disc carried by each said output shaft; at least one friction disc carried by said drum member, said friction discs being adjacent to one another and adapted, when compressed together in frictional engagement, to transmit drive from said hub member to said output shaft; an annular pressure plate disposed between said hub member and one of said friction discs; actuating means in the form of a lever disposed within the radial, axially extending slot in said hub member to urge said pressure plate against said disc to compress said disc into engagement with an adjacent disc; and resilient means for constantly urging said annular pressure plate towards said hub member in opposition to movement of said actuating means.

2. The clutch mechanism as defined in claim 1 wherein said actuating means comprises a pivoted lever, said lever having plurality of lobes including a first lobe engageable with one of said pressure plates, a second lobe engageable with the other of said pressure plates and a third lobe adapted to be engaged by a shifting collar.

3. A clutch mechanism comprising a hub member, a drive shaft connected to said hub member, said drive shaft having portions extending axially from opposite sides of said hub member, driven shafts journalled on said axially extending shaft portions, a pair of friction disc receiving drums adjustably threaded onto opposite ends of said hub member, friction disc clutch units received within each said drum, each said friction disc clutch unit including a first set of friction discs in driving engagement with said drum and a second set of friction discs in driving engagement with one of said driven shafts, said first and second sets of friction discs being disposed in alternating relation whereby said drum and said driven shaft are frictionally coupled together when said friction discs are axially compressed, and actuator means associated with said hub member, said actuator means including at least one pivotally mounted lever unit adapted to selectively and alternately compress said friction disc clutch units.

4. A clutch mechanism comprising a hub member, a drive shaft connected to said hub member, said drive shaft having portions extending axially from opposite sides of said hub member, driven shafts journalled on said axially extending shaft portions, a pair of friction disc receiving drums adjustably threaded onto opposite ends of said hub member, friction disc clutch units received within each said drum, each said friction disc clutch unit including a first set of friction discs in driving engagement with said drum and a second set of friction discs in driving engagement with one of said driven shafts, said first and second sets of friction discs being disposed in alternating relation whereby said drum and said driven shaft are frictionally coupled together when said friction discs are axially compressed, and actuator means associated with said hub member, said actuator means including an annular pressure plate associated with each said friction disc clutch unit, spring washer means between each said pressure plate and each said friction disc clutch unit, and a plurality of pivotally mounted lever units adapted to alternately and selectively engage said pressure plates to actuate said friction disc clutch units.

5. The clutch mechanism as defined in claim 4 wherein said lever units are received within a plurality of radially extending slots in said hub member, each said lever unit comprising a pair of spaced plates having a plurality of lobes, rollers disposed between said plates adjacent each lobe, and an operating collar engaging one of said rollers whereby one of said other rollers rides up against one of said pressure plates when said collar is shifted axially.

6. Apparatus as defined in claim 4 wherein said pivotally mounted lever units are movable from a neutral position to a clutch engaging position wherein the portion of said lever units in engagement with said pressure plates passes a dead-center position such that the reaction force against the engaging portion maintains said lever units in a locked relationship.

References Cited by the Examiner

UNITED STATES PATENTS

| | | | |
|---|---|---|---|
| 1,654,911 | 1/28 | Bartholomew | 192—69 |
| 2,205,989 | 6/40 | Myers et al. | 192—69 |
| 2,276,276 | 3/42 | Livingston | 192—69 |
| 2,376,136 | 5/45 | Gerst | 192—98 X |
| 2,464,538 | 3/49 | Vanderzee | 192—87 |
| 2,847,102 | 8/58 | Tiedeman et al. | 192—111 |
| 2,856,048 | 10/58 | Carlson. | |
| 3,125,202 | 3/64 | Hill. | |

DAVID J. WILLIAMOWSKY, *Primary Examiner.*